United States Patent [19]
Leet

[11] 3,887,092
[45] June 3, 1975

[54] TAIL GATE LIFT MECHANISM
[76] Inventor: Richard A. Leet, 3118 Williamsburg Ave. N.W., Warren, Ohio 44485
[22] Filed: Mar. 16, 1973
[21] Appl. No.: 341,883

[52] U.S. Cl. .............................. 214/75 T; 187/95
[51] Int. Cl. ............................................ B60p 1/44
[58] Field of Search ......... 187/9, 17, 95; 214/75 R, 214/75 T, 660; 292/59

[56] References Cited
UNITED STATES PATENTS

| | | | |
|---|---|---|---|
| 1,531,901 | 3/1925 | Clark | 292/59 |
| 2,706,565 | 4/1955 | Krasno | 214/75 T |
| 3,024,926 | 3/1962 | Nolden | 214/75 T |
| 3,048,283 | 8/1962 | Phillips | 214/75 T |
| 3,282,449 | 11/1966 | Buford | 214/75 T |
| 3,520,426 | 7/1970 | Hostetler | 214/75 T |
| 3,747,782 | 7/1973 | Brown | 214/75 T |

Primary Examiner—Robert J. Spar
Assistant Examiner—Lawrence J. Oresky
Attorney, Agent, or Firm—Michael Williams

[57] ABSTRACT

A simplified mechanism for vertically moving the tail gate of a truck. A mechhanism is built as a unit which may be connected to and removed from the truck through simple attachment means. The unit includes a support frame comprising a pair of upright, hollow members which are secured to opposite sides of the truck body at the rear thereof. A roller assembly is vertically movable within each upright member and the tail gate is connected to such assemblies for movement therewith. Power means, preferably in the form of hydraulic cylinders, have cable connection with the roller assemblies to provide for movement of the latter. Safety latch means are provided to insure that the tail gate is not unintentionally lowered beyond the level of the truck bed.

1 Claim, 9 Drawing Figures

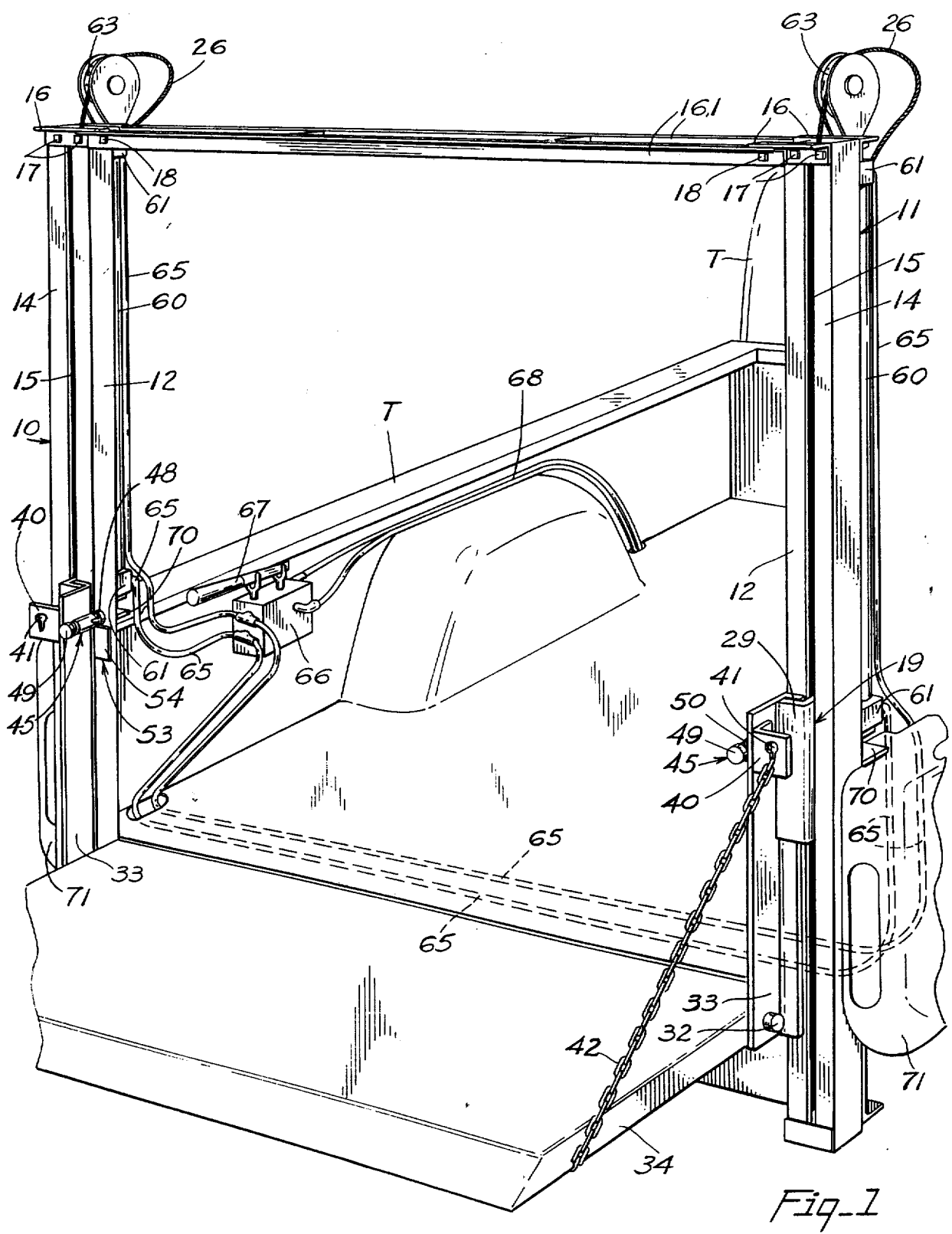
Fig_1

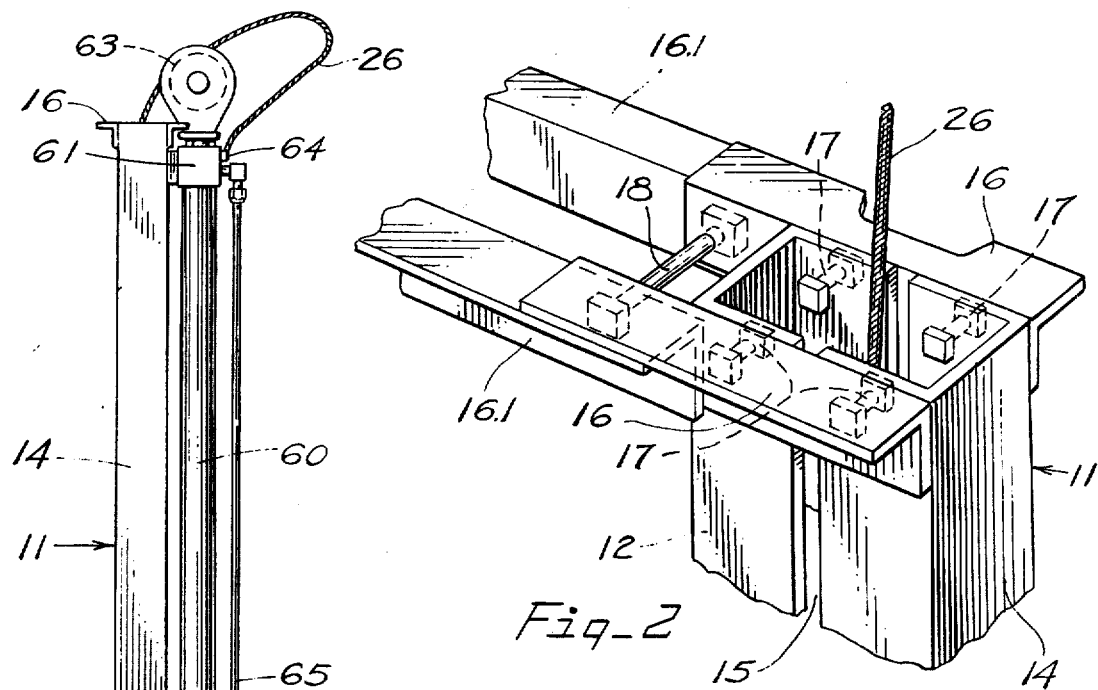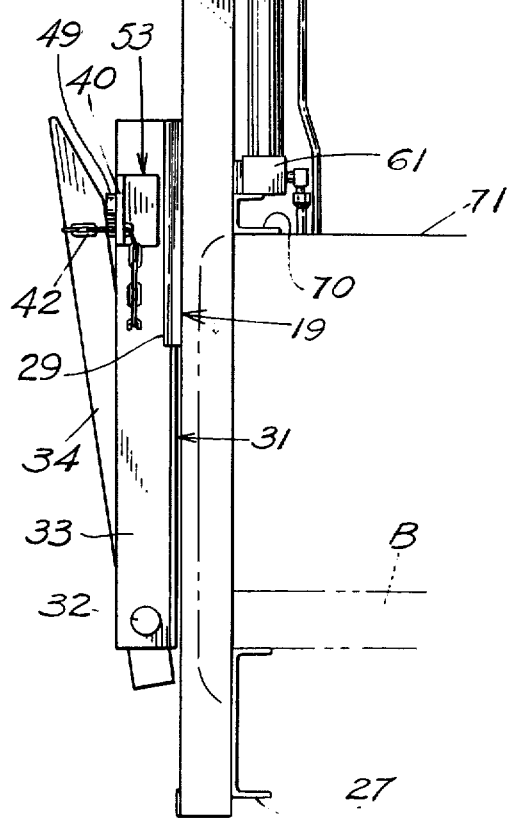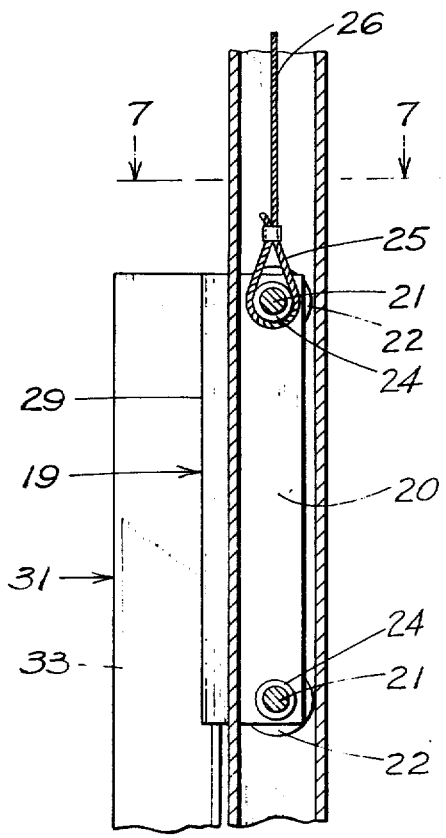

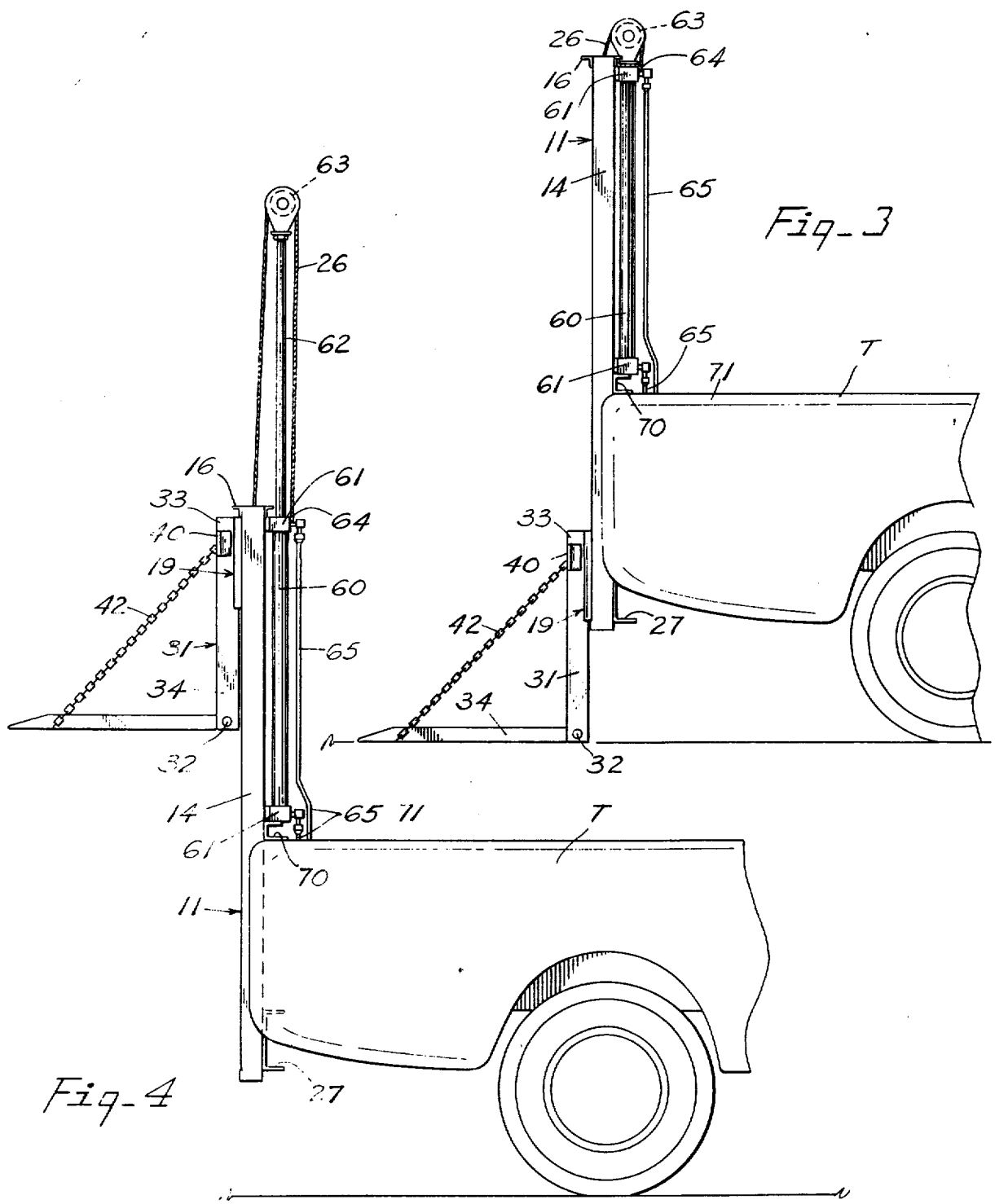

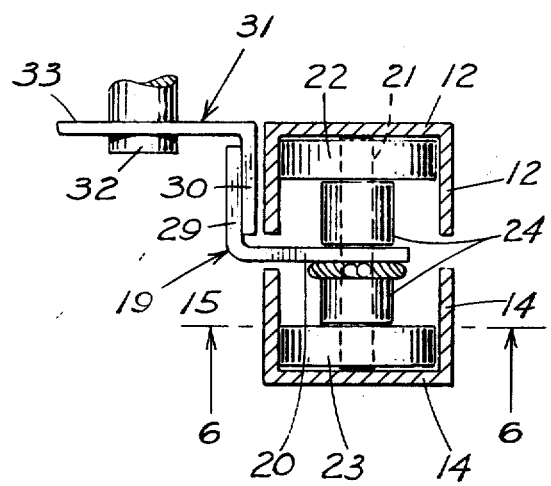
Fig_7
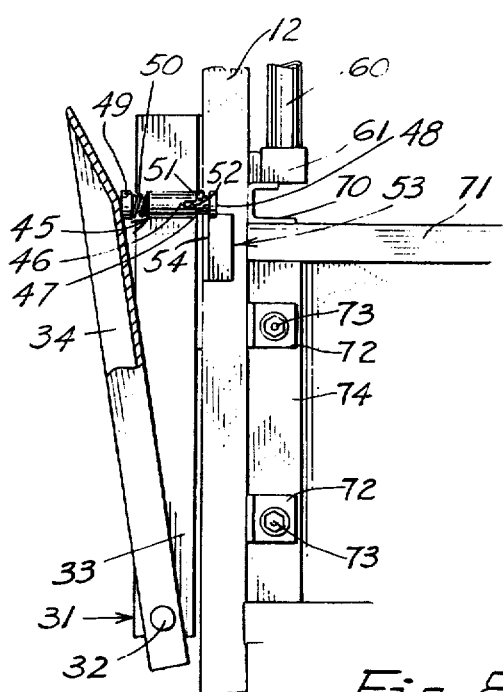
Fig_8
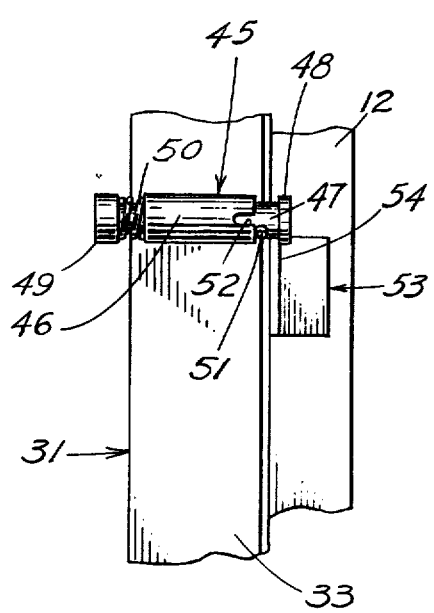
Fig_9

TAIL GATE LIFT MECHANISM

BACKGROUND AND SUMMARY

Tail gate elevators are known in the prior art but their use in commercial form has been limited. This may be because their constructions are unduly complex and therefore relatively expensive, or because they are permanent part of the truck and cannot be readily removed to permit use of the truck without the elevator, or for other reasons.

My improved tail gate lift mechanism is simple in construction and therefore relatively low in cost. The mechanism is constructed as a unit so that a truck owner may purchase and install it at any time, through use of simple attachments which require only commonly available tools.

The mechanism includes a frame comprising a pair of upright, hollow members, each member being formed as a pair of metal channels which face each other but are rigidly connected in slightly spaced relation to provide a vertically extending slot. A roller assembly is disposed within each hollow member for vertical movement, and the tail gate is connected to the roller assemblies for movement therewith.

An elongated hydraulic cylinder is associated with each upright, hollow member, the piston rod of each cylinder effecting movement of a flexible cable which is connected to a respective roller assembly. A safety latch is carried by each roller assembly and is adapted to engage a stop welded to a respective vertical, hollow member, at a precise location to limit unintentional downward movement of the tail gate below the level of the truck bed. This latch is automatically set when the tail gate is in closed position. The latch is manually moved and may be retracted when the tail gate is open so that the latter may be lowered to ground level.

DESCRIPTION OF THE DRAWINGS:

In the drawings accompanying this specification and forming a part of this application, there is shown, for purpose of illustration, an embodiment which my invention may assume, and in these drawings:

FIG. 1 is a fragmentary, perspective view of the rear of a pickup truck, showing my invention attached thereto, FIG. 2 is an enlarged, fragmentary, perspective view of a detail, FIG. 3 is a fragmentary side view of the truck, drawn to a smaller scale, showing the tail gate lowered to ground level, FIG. 4 is a view similar to FIG. 3, showing the tail gate in an elevated position, FIG. 5 is an enlarged fragmentary view, similar to FIG. 3, showing the tail gate in position to close the rear end of the truck bed, FIG. 6 is an enlarged, fragmentary sectional view corresponding to the line 6—6 of FIG. 7, FIG. 7 is an enlarged, transverse sectional view corresponding to the line 7—7 of FIG. 6, FIG. 8 is a fragmentary, sectional view showing the tail gate cooperating with a safety latch, and FIG. 9 is an enlarged, fragmentary detail of the safety latch and cooperating parts.

DESCRPTION OF PREFERRED EMBODIMENT

My invention is disclosed herein as attached to the rear of a pickup truck T and the connection is such that the tail gate lift mechanism may be attached or removed from the truck with ordinarily available tools and in a relatively short time.

The lift mechanism comprises a pair of upright hollow members 10,11 of identical construction so that a description of one will fit the other. As best seen in FIGS. 1 and 7, each upright member comprises a pair of elongated channel members 12,14 which are firmly held in facing relation, but slightly spaced to provide a vertically extending slot 15 for a purpose to appear. The upper ends of the channel members extend well above the truck bed, as seen in FIGS. 1, 3 and 4. The upper ends of each pair of channel members 12 and 14 may be connected by short angles 16 (see FIG. 2) which are bolted to respective members by bolts 17. Extending between and bolted to the short angles 16, as by bolts 18, are elongated angles 16.1 which serve not only as a brace between the upright members but may also serve as a support for a chain hoist (not shown) or the like. The elongated angles 16.1 may be removed, if desired.

An angle piece 19 is positioned for movement vertically of each upright member and, as best seen in FIG. 7, each angle piece has a leg 20 extending through the vertical slot 15 and disposed within the space formed by the channel members 12 and 14. A spindle 21 is secured in position at the upper and lower ends of each leg 20 and each spindle supports a pair of rollers 22,23 with suitable bearings (not shown) providing for free rotation of the rollers. The rollers are of a diameter to freely roll along the inner surfaces of the legs of channel members 12 and 14, and have hubs 24 to retain the rollers in proper position. The hub for roller 23 of the upper set of rollers is shorter to provide a space so that the lower end 25 of a flexible cable 26 may be looped about the upper spindle 21. The lower ends of the pairs of chananel members 12 and 14 may be welded or bolted to a substantial channel 27 which is disposed crosswise of and beneath the rear of the truck bed B, but has no connection therewith.

Welded to the other leg 29 of each angle piece 19 is one leg 30 of a longer angle piece 31. A shaft 32 extends crosswise between the other legs 33 and provides a pivot about which the tail gate 34 swings. The tail gate may be of any standard design and, as a matter of fact, may be the same tail gate with which the pickup truck T was originally equipped.

It will be appreciated that the angle pieces 19—19 and their roller mounts provide roller assemblies by means of which the angle pieces 31—31 and the tail gate 34 may be moved vertically of the upright members 10,11. The spacing between the upper and lower sets of rollers on each angle piece 19 is such as to prevent any binding action and therefore provide for free vertical movement of the tail gate when a load is applied thereto.

An angle clip 40 is welded to the upper end of the leg 33 of each angle piece 31—31 and this clip is formed with the keyhole opening 41 through which the upper end of a chain 42 may be disposed. The lower end of the chain may be secured to the respective side of the tail gate in conventional manner. Each chain may be pulled through the larger part of a respective opening 41 and then a selected link may be moved into the smaller part of the opening so as to hold the tail gate in any desired pivoted position. Preferably, the chains are so adjusted that during operation of the lift mechanism, the tail gate is parallel with the floor of the truck bed B.

A safetylatch 45 is carried by each angle piece 31 to prevent the tail gate 34 from being unintentionally lowered below the level of the truck bed floor. In the disclosed embodiment, each safety latch comprises a short metal tube 46 (see FIG. 9) which is welded to the leg 33 of a respective angle piece 31, and in which a latch pin 47 is slidably mounted. Each pin has an integral head 48 at one end and a removable head 49 at the other end. A coil spring 50 is disposed between the head 49 and the adjoining end of the tube 46 to urge the pin 47 to retracted position, that is, a position wherein the head 47 abuts the adjoining end of the tube 46. A cross pin 51 is carried by each latch pin 47 and the latter may be rotated so that the cross pin 51 engages the end of the tube 46 and thereby holds the latch pin extended, as seen in FIG. 9. The tube 46 has a slot 52 into which the cross pin 51 seats when the latch pin 47 has been rotated to align the cross pin with the slot, whereupon the spring 50 holds the head 48 in retracted position against the end of the tube 46.

An angle clip 53 is welded in precise vertical location on each channel member 12 and each clip has a leg 54 so disposed that its upper edge is cooperable with a respective latch pin 47, as best seen in FIGS. 1 and 9. With the latch pin 47 extended, as shown in FIG. 9, it will abut the upper edge of a respective leg 54 and thus prevent further downward movement of the angle pieces 31, and tail gate 34. When the latch pins 47 are retracted, the heads 48 will clear the respective legs 54 and permit lowering of the tail gate 34 to any desired level below the truck bed surface.

Means are provided to elevate and lower the tail gate and these means may be in the form of air or hydraulic cylinders, electric motors, or manually operable cranks. In the preferred form, the elevating means takes the form of a pair of identical, elongated hydraulic cylinders 60 having heads 61 at upper and lower ends. A piston rod 62 is slidable in each cylinder 60 and has the usual piston at its lower end and the usual bearing relation with the upper cylinder head 61. A pulley 63 is connected to the upper end of each piston rod 62 and a respective cable 26 is trained over the pulley and has its free end securely connected to the upper cylinder head 61 by a clamp arrangement 64.

Hydraulic fluid lines 65 are connected to upper and lower cylinder heads 61, and these lines lead to a valve 66 which may be manually controlled by a hand lever 67. The valve may be a three position type available commercially, with a central neutral position, and preferably the valve plunger is spring pressed so that it tends to remain in neutral position. The valve 66 receives fluid from a pump (not shown) by means of fluid lines 68. The pump may be of the type commonly used in power brake systems and may be belt-driven from the engine of the truck.

Each hydraulic cylinder 60 has a short channel piece 70 bolted or welded to the lower cylinder head 61, and this channel piece seats on upper surfaces of the respective sides 71 of the truck body to support the load of the lift mechanism and any load imposed thereon. As best shown in FIG. 8, short angle pieces 72 are welded to the respective channel members 14,14 and are detachably connected, as by bolts 73, to upright channels 74 which form part of the truck body sides at the rear thereof. To detach the entire tail gate lift mechanism, it is only necessary to remove bolts 73 and lift the mechanism clear of the truck body.

The tail gate 34 is shown level with truck bed in FIG. 1. To elevate the tail gate from this position, and assuming the truck engine is operating, the truck operator need merely move the valve handle 67 from neutral position to a position wherein fluid under pressure is delivered to the lower heads 61 of both cylinders 60. This will drive the piston rods 61 upwardly so that the pulleys 63 push against intermediate portions of the respective cables 26 and thus pull the roller assemblies (formed by the angle pieces 19 and rollers thereon) and connected angled pieces 31 and tail gate upwardly. The upper limit of the tail gate 34 is shown in FIG. 4, and is determined by abutment of the upper ends of the angle pieces 31 with the lower ends of the short angles 16 secured to the top of the channel members 12 and 14. The operator will thus be advised when the tail gate has reached its upper position and will permit the hand lever 67 to return to its neutral position wherein hydraulic fluid is blocked from flowing from the lower cylinder heads 61 to thereby maintain the tail gate 34 in elevated position. In the position shown in FIG. 4, the truck may be backed against a loading platform, or any other elevated structure level with the tail gate, and heavy articles may be slid from the loading platform directly onto the tail gate 34.

To lower the tail gate from the elevated position shown in FIG. 3, the operator will move the hand lever to its other position wherein hydraulic fluid is permitted to flow from the lower cylinders heads 61 and fluid is admitted to the upper cylinder heads. The weight of the tail gate 34 and any load thereon, together with the fluid admitted to the upper cylinder heads 61, will cause the tail gate to lower. If the latch pins 47 are in the extended position shown in FIG. 9, such pins will engage the upper edge of respective angle clips 53 to limit of downward movement of the tail gate to the level of the truck bed.

If it is desired to move the tail gate to a lower level, it is necessary to retract the latch pins 47 before the tail gate reaches the level of the truck bed. Then the tail gate may be lowered until the mounts for the pulleys 63 abut the upper cylinder heads. For practical purposes, the cylinders 60 are long enough so that the tail gate is level with the truck bed when the pulley mounts abut the upper cylinder heads. However, as seen in FIG. 3 and 5, there remains enough slack in the cables 26 to permit the tail gate to be lowered to the ground, whereby a heavy article may be slid on the tail gate and elevated to truck bed level, or higher. It will be appreciated that by fixing one end of the cables 26 to the cylinders, and training the intermediate portion over the pulleys 63, the tail gate may be lifted twice the distance of the stroke of the cylinders 60.

As seen in FIG. 8, when the tail gate is in position to close the rear end of the truck, it automatically abuts the heads 49 of the latch pins 47 to extend the same and thus prevent the tail gate to lower below the level of the truck bed.

The elongated angle 16.1 is not always necessary and sometimes it is preferred not to include the same. This angle may be simply removed by removing the bolts 18. If, for any reason, a roller assembly is to be removed from its upright hollow member 10 or 11, the short angles 16 may be removed by removing the bolts 17, and the roller assembly may be withdrawn through the upper open end of its related upright member.

Instead of driving the hydraulic pump by belt connection with the truck motor, an electric motor, receiving power from the truck battery, may drive this pump. Further, the cylinders 60 may be replaced by small electric D. C. motors secured to the upper ends of the upright members 10, 11, the motors being operated in unison. Each motor would have a drum on its shaft and instead of fixing the cables to a stationary part, the cables would be wound on motor drums.

For manual operation, rods, like the cylinder rods, would be mounted on the upright members 11,12 for vertical sliding movement. These rods would be in the form of gear racks and each would have a pulley 63 supported at its upper end, with the cables 26 trained over the pulleys and having their ends fixed to the upright members, instead of to the cylinders 60. Gears would be rotatably mounted on the upright members for cooperation with respective racks, and hand cranks would be employed to rotate the gears. A suitable pawl arrangement would be provided to hold the tail gate in a selected position.

I claim:

1. A tail gate lift mechanism for attachment to the rear portion of a truck, comprising:

a pair of elongated hollow members, each attached to one side of the truck at the rear thereof and extending vertically, each member having a longitudinally extending slot, a roller assembly disposed within each hollow member for vertical movement therein, each roller assembly having a leg portion extending through a respective slot, a tail gate member connected to each leg portion outwardly of the related hollow member, a tail gate pivotally connected between said tail gate members, power means connected to said roller assemblies to elevate the same and thus the tail gate, latch means supported for movement with said tail gate and operable to stop unintentional movement of the latter below the level of the bed of said truck, said latch means comprising a short tube connected to said tail gate member, a rod slidably carried within said tube, and a stop secured to a hollow member, said rod engaging said stop to limit downward movement of said tail gate, said rod being movable to a retracted position clear of said stop to permit movement of said tail gate to a position below the level of said truck bed, said tail gate when swung to position closing the rear of said truck bed automatically moving said rod to an extended position for engagement with said stop.

* * * * *